(12) United States Patent
Harvey

(10) Patent No.: US 7,650,508 B2
(45) Date of Patent: Jan. 19, 2010

(54) TIME STAMPING SYSTEM

(75) Inventor: Ian Nigel Harvey, Fenditton (GB)

(73) Assignee: Ncipher Corporation Limited, Cambridge (GB)

( * ) Notice: Subject to any disclaimer, the term of this patent is extended or adjusted under 35 U.S.C. 154(b) by 904 days.

(21) Appl. No.: 10/488,979

(22) PCT Filed: Sep. 10, 2002

(86) PCT No.: PCT/GB02/04102

§ 371 (c)(1),
(2), (4) Date: Jan. 11, 2005

(87) PCT Pub. No.: WO03/030446

PCT Pub. Date: Apr. 10, 2003

(65) Prior Publication Data

US 2005/0125672 A1    Jun. 9, 2005

(30) Foreign Application Priority Data

Sep. 28, 2001    (GB) ................................ 0123453.3

(51) Int. Cl.
*H04L 9/32*    (2006.01)
(52) U.S. Cl. ...................... 713/178; 340/825
(58) Field of Classification Search .............. 380/51; 713/177, 178, 193, 400; 340/825
See application file for complete search history.

(56) References Cited

U.S. PATENT DOCUMENTS

| 4,644,542 | A |   | 2/1987  | Aghili et al. |              |
|-----------|---|---|---------|---------------|--------------|
| 5,001,752 | A | * | 3/1991  | Fischer       | 713/178      |
| 5,136,643 | A | * | 8/1992  | Fischer       | 713/178      |
| 5,136,647 | A | * | 8/1992  | Haber et al.  | 713/178      |
| 5,189,700 | A | * | 2/1993  | Blandford     | 713/178      |
| RE34,954  | E | * | 5/1995  | Haber et al.  | 713/177      |
| 5,923,763 | A | * | 7/1999  | Walker et al. | 380/51       |
| 6,009,177 | A |   | 12/1999 | Sudia         |              |
| 6,078,930 | A |   | 6/2000  | Lee et al.    |              |
| 6,367,013 | B1| * | 4/2002  | Bisbee et al. | 713/178      |
| 6,742,119 | B1| * | 5/2004  | Peyravian et al. | 713/178   |
| 6,792,536 | B1| * | 9/2004  | Teppler       | 713/178      |
| 6,931,537 | B1| * | 8/2005  | Takura et al. | 713/178      |

(Continued)

OTHER PUBLICATIONS

Shiuh-Pyng Shieh, Digital multisignature schemes for authenticating delegates in mobile code systems, date: Jul. 2000, vol. 49, issue 4, pp. 1464-1473.*

(Continued)

*Primary Examiner*—Michael J Simitoski
*Assistant Examiner*—Monjour Rahim
(74) *Attorney, Agent, or Firm*—Locke Lord Bissell & Liddell

(57) ABSTRACT

A secure time stamping device uses multiple virtual clocks, each of which may be individually accessed and calibrated. A digital key is associated with each of the clocks. All of the virtual clocks use a common timer (130), with the actual clock output being generated by applying calibration information (124) for that clock to the timer (130) output. A user wishing to have a message time stamped presents that message along with information as to which virtual clock to be used at a device input (92). The appropriate calibration information (124) is then selected and the timer (130) output is compensated accordingly. The incoming message plus the resultant time are concatenated and automatically signed using the key (126) applicable to that particular virtual clock.

15 Claims, 2 Drawing Sheets

U.S. PATENT DOCUMENTS

| | | |
|---|---|---|
| 6,965,998 B1 * | 11/2005 | Peyravian et al. ............ 713/178 |
| 7,120,800 B2 * | 10/2006 | Ginter et al. ................. 713/193 |
| 7,272,720 B2 * | 9/2007 | Hasebe et al. ............... 713/178 |
| 7,395,447 B2 * | 7/2008 | Prihadi et al. ............... 713/400 |
| 2001/0016849 A1 | 8/2001 | Squibbs |
| 2002/0104004 A1 * | 8/2002 | Couillard .................... 713/178 |
| 2002/0120850 A1 * | 8/2002 | Walker et al. ............... 713/178 |

OTHER PUBLICATIONS

Bruce Schneier, "Applied Cryptography Second Edition", 1996, John Wiley & Sons, Inc., pp. 38, 75-76.

* cited by examiner

TIME STAMPING SYSTEM

The invention relates to a device and method for providing digital time stamps on documents or other digital data. Such devices may be used to provide what are sometimes called "Digital Notary Services".

Devices which can issue digital time stamps on documents or other digital data, by means of a digital signature, are useful in many applications. Typically, such devices include an internal time source which can be trusted to be accurate and which cannot be corrupted by outside means. The output from the time source is combined in some way with the document or other digital data to be time stamped, and the combination is then cryptographically signed. Known devices of this type are described in U.S. Pat. No. 5,001,752 and U.S. Pat. No. 5,136,647.

A generalised view of a known time stamping device is shown in FIG. 1. In normal operation, the device 20 accepts a time stamp request from a client. On receipt of the request, it obtains a time value from a time source or clock 40, and combines it with the data in the request by means of a digital signature, produced by a signature generator 50. The signature generator makes use of a signature key, which is itself kept secret within the device 20 in a key store 80.

The output 55 of the device thus comprises a time stamped and digitally signed copy of the original time stamp request 22.

Setting the clock 40 is the responsibility of an external Time Authority 10. When the Time Authority wishes to reset the clock, it transmits a clock setting request 15 which is received by a clock access control 30. The clock access control checks the credentials presented by the Time Authority and, if the credentials are acceptable, permits the clock 40 to be reset.

Management of the key is the responsibility of an external Key Authority 60. A key access control 70 receives key management signals 65 from the Key Authority and, provided access is granted, updates the key store 80 accordingly.

One of the problems with this type of device is that the Key Authority must implicitly trust the Time Authority to set the time correctly. Often, the Key Authority and the Time Authority are different organisations: for instance, the Key Authority may run a revenue-generating service using machines owned and maintained by the Time Authority. The latter then has to assure the former that its maintenance procedures are fully trustworthy.

It is also quite common for the Time Authority to sub-contract to a third party such as an ASP (Application Service Provider) the operation of the computers on which the service actually runs. In order to reset its own clock, the Time Authority logs in remotely to the computer being operated on its behalf within the ASP.

One individual ASP may, however, wish to provide facilities for more than one Time Authority. This is expensive, as it requires that the ASP provides individual secure computers for each Time Authority that it wishes to service. The hardware required by each Time Authority is essentially identical, but it has to be replicated for security reasons.

A similar problem arises where the ASP wishes to act for a number of different Key Authorities, each of which requires to act as its own Time Authority (in other words need to have control over the time used in time stamps which are issued on its behalf). Once again, the only realistic solution is replication of the hardware.

It is an object of the present invention at least to alleviate these problems of the prior art.

It is a further object of the invention to provide a time stamping device and method which can be used by multiple time authorities, key authorities and users, at little additional cost.

According to a first aspect of the present invention is there is provided a time-stamping device for digitally time-stamping input data, comprising:
- (a) a timer (130) having a timer output;
- (b) memory means (120) for storing a plurality of sets of timer calibration information (124), each defining characteristics of a respective virtual clock;
- (c) compensation means (140) for adjusting the timer output in accordance with a user-selected virtual clock, to generate a selected virtual clock output; and
- (d) signature means (150) for generating a time-stamped output (94) in dependence upon the selected virtual clock output and the input data.

According to a second aspect, there is provided a method of digitally time-stamping input data, comprising:
- (a) selecting one set of timer calibration information (124) from a plurality of such sets, each set defining the characteristics of a respective virtual clock;
- (b) adjusting a timer output in accordance with the selected set to generate a selected virtual clock output; and
- (c) signing data representative of both the selected virtual clock output and the input data to generate a time-stamped output (94).

With such an approach, we can provide different time sources from the same timer, simply by changing the calibration data. The timer is an expensive piece of circuitry, whereas multiple calibration data sets can be stored in a very inexpensive memory device. We can therefore provide for multiple independently-controllable time sources at little extra cost.

The compensation means preferably adjusts the timer output in accordance with a compensation algorithm. This could be user defined (for each of the virtual clocks), but more typically will simply adjust the offset and drift of the timer output in comparison with an externally-maintained reference clock held for example by a Time Authority. Thus, in a simple embodiment, the timer calibration information for each of the virtual clocks may simply consist of two numbers: the offset and the drift rate.

The signature means generates the time-stamped output in dependence upon both the selected virtual clock output and the input data. This could conveniently be done simply by concatenating the selected virtual clock output and the input data, and by signing the resultant concatenated string. Alternatively, other approaches to combining the data prior to signature could easily be envisaged.

Preferably, each signature key may comprise the private part of a public/private key pair within a public key cryptosystem such as for example RSA or DSA.

Access check/control means may be provided to check the credentials of any user wishing to have data time stamped using a particular virtual clock. Likewise, access check/control means may be provided allowing a Time Authority to change the calibration information for a particular virtual clock, and for a Key Authority to carry out key management tasks. It will be understood, of course, that (where provided) the time stamp access control means, the key access control means and the virtual clock access control means are not necessarily physically separate entities: they may if convenient be embodied within the same hardware and/or within the same software routines.

According to a further aspect of the present invention there is provided a time-stamping device for digitally time-stamping input data, comprising:

(a) a plurality of user-selectable clocks, each having a signature key (120) associated with it; and (b) signature means (150) for generating a time-stamped output (94) in dependence upon an output of a user-selected clock and the input data.

According to yet a further aspect, there is provided a method of digitally time-stamping input data, comprising:

(a) selecting one of a plurality of user-selectable clocks, each having a signature key (120) associated with it; and (b) generating a time-stamped output (94) by signing data representative of an output of the selected clock and the input data.

The invention may be carried into practice in a number of ways and one specific embodiment will now be described, by way of example, with reference to the accompanying drawings in which.

The invention proceeds from the recognition that we can construct a controllable clock by taking a free running timer and observing whether it runs fast or slow compared with a reference time source. By determining the offset and drift in comparison with the reference time source we can construct a set of calibration data which we can apply to the output of the timer to convert the timer output to the "correct" time (that is, the time as defined by the reference time source).

While the concept of compensated clock output is, in itself, known, the present applicant has taken the concept further by allowing for the possibility of producing different controllable time sources from the same free-running timer, simply by changing the calibration data. This provides us with a way of creating multiple controllable virtual clocks, all of which use a common physical timer.

Figure 1:
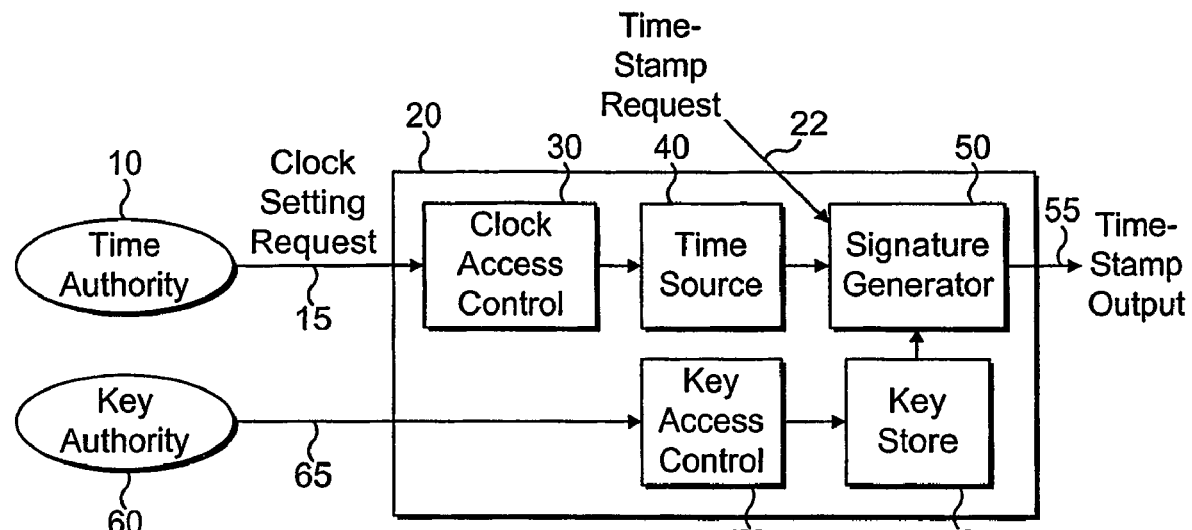
FIG. 1 is a schematic generalised view of a prior art time stamping device.
Figure 2:
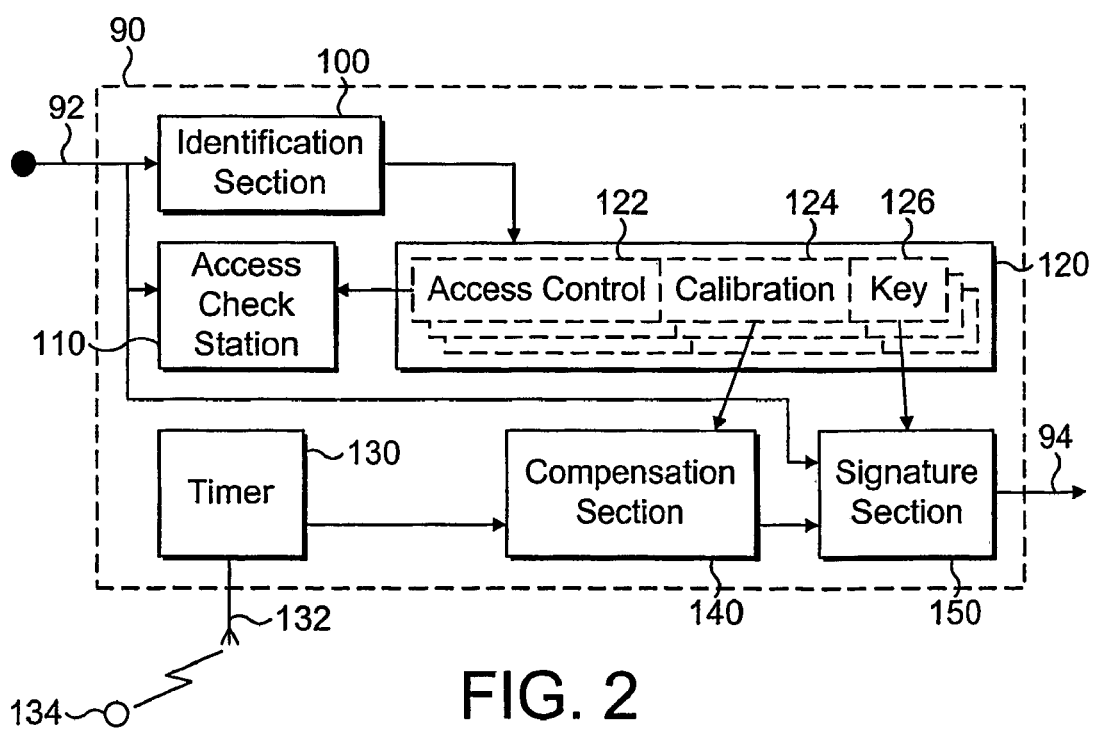
FIG. 2 is a time stamping device according to an embodiment of the present invention.

FIG. 2 illustrates the preferred time stamping device of the present invention. This provides for multiple virtual clocks, using the same physical timer, each of which has its own access control, calibration information and digital signature key.

The time stamping device shown in FIG. 2 preferably takes the form of a discrete hardware module having a security boundary illustrated by the dotted line 90. Information stored within this boundary may be extracted and/or modified only by users presenting suitable credentials. Thus, to the user, the device effectively appears to be a black box having a single input 92 and a single output 94. Alternatively, for less demanding applications, the device need not be in a separate security module but could be integrated into a general purpose computer system. Some or all of the elements shown may be implemented in hardware or alternatively in software.

As previously mentioned, the device includes a plurality of virtual clocks, the characteristics of each clock being defined by information stored in a memory 120, namely access control information 122, calibration information 124 and key information 126. The key information preferably comprises a public/private key pair. All of the virtual clocks make use of a common timer 130, which may either be a free running timer or, alternatively, may itself receive its time from a trusted external source 134 via a radio aerial 132 or some other means of communication (not shown).

A user wishing to have a document or other data time stamped presents the data along with appropriate access credentials at the device input 92. This information is first passed to an identification section 100 which uses identifier information within the credentials to look up from within the memory 120 the information relating to the appropriate virtual clock that is to be used. The access control information 122 for this clock is passed to an access check section 110, which checks whether the credentials supplied in the request are correct.

Assuming that the access check passes, a time value is then read from the timer 130 and is then corrected by a compensation section 140 using the appropriate calibration information 124 for that particular virtual clock. The calibrated time is then passed on to a signature section 150, where it is combined with the original data supplied at the input 92, and signed with the corresponding appropriate key 126.

The time stamped and signed data is then passed to the output 94.

Requests to calibrate a particular virtual clock (for example on behalf of a particular Time Authority) are also supplied to the device at the input 92, along with appropriate credentials authorising the device to allow the re-calibration. It will be understood of course that these credentials will typically be different from those required for simple time stamp requests. Provided that the credentials are passed by the access check section 110, the calibration information 124 for that particular virtual clock may be updated. Typically, the Time Authority may simply supply a "reference" time in its request, and that is simply compared with a time value read from the timer 130 to compute a new set of calibration data.

The device additionally responds to requests made at the input 92, with appropriate credentials, to perform key management operations, such as setting the key, generating a new key, requesting the public half of the signing key and so on. These functions may typically be required by an external Key Authority.

The access control information 122, for any given virtual clock, may define how and to what extent requests to change the calibration information 124 and/or the key information 126 may be permitted.

Modification of the access control information 122 itself may be permitted on the presentation of different high-level access credentials at the input 92.

Figure 3:
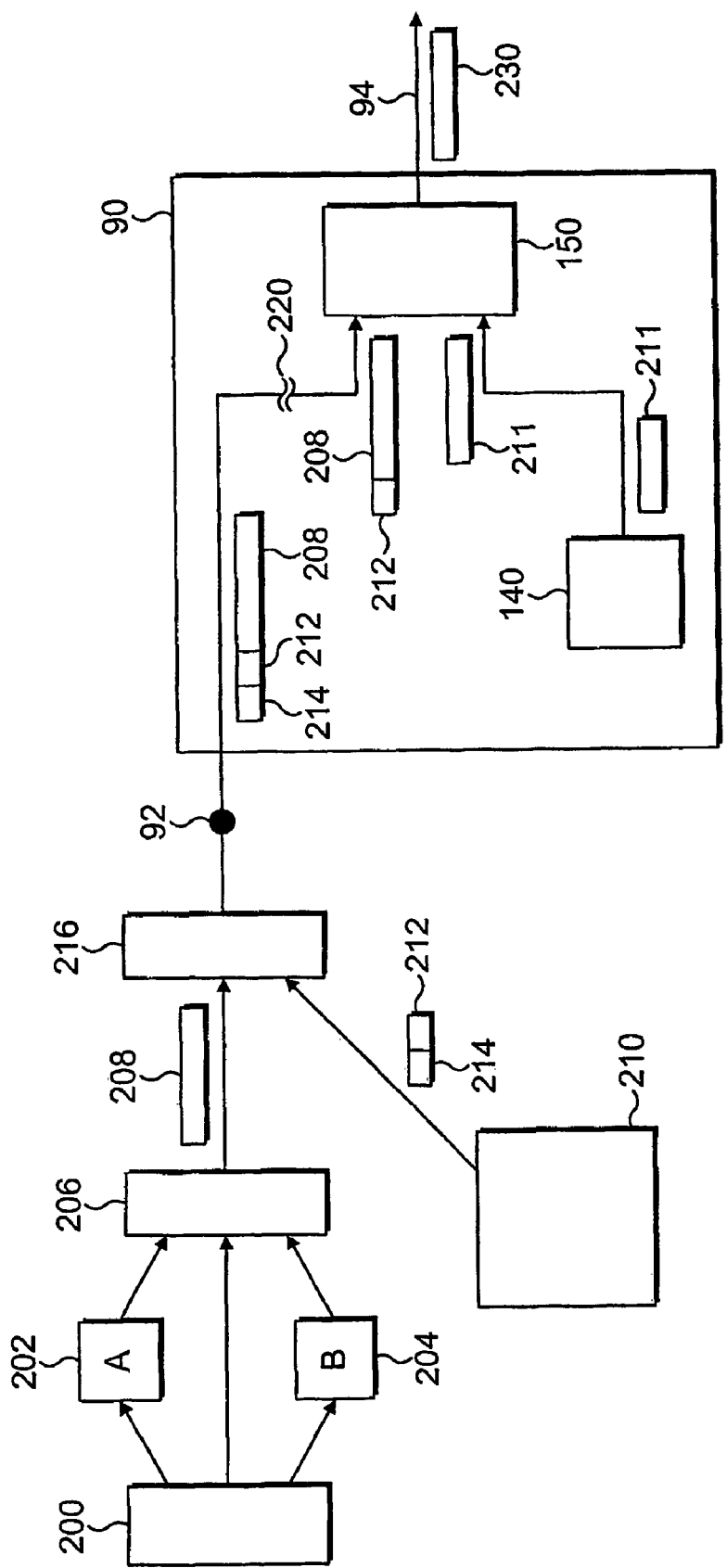
FIG. 3 illustrates the way in which the time stamping device of FIG. 2 may be used to time stamp an executed document.

FIG. 3 illustrates the way in which the time stamping device of FIG. 2 may be used in practice to time stamp a contract signed by two parties A and B.

A contract 200 is sent separately to the two contracting parties A 202 and B 204 for signature. The individually signed contracts, along with the original contract are supplied to a hash function 206 which concatenates the inputs and creates a "message digest" 208. This is essentially uniquely representative of both the original contract and the fact that both parties A and B have signed.

The message digest 208 now needs to be presented to the time stamping device, and to that end a requester 210 of the time stamp generates a message identifier (header) 212 containing relevant information such as an explanation of what the document was that has been signed, who the signatories are, a statement that the time stamp will be applied using GMT and so on. In addition, the requester generates the necessary credentials and identifying information 214 which will be used by the device 90 to authorise the request and to ensure that the correct virtual clock is used.

At 216, the credentials 214, header 212 and message digest 208 are concatenated and are supplied to the input 92.

Within the device, the credential and control information 214 is stripped away (as illustrated schematically by the wavy lines 220), leaving just the header 212 and the message digest 208 to be presented as one input to the signature section 150.

The other input is a time message 211, as supplied by the compensation section 140. These two inputs are concatenated and digitally signed as previously described using the appropriate private key for that particular virtual clock. The time stamped and signed output message 230 is then set to the device output 94.

It will be understood of course that any type of digital document or data may be electronically signed and time stamped.

The invention claimed is:

1. A time-stamping device for digitally time-stamping input data, comprising:
    (a) a free-running timer having a timer output;
    (b) a memory means for storing a plurality of sets of timer calibration information, each defining characteristics of a respective virtual clock;
    (c) means for calibrating each virtual clock by updating the respective timer calibration data set in the memory means;
    (d) compensation means for receiving the timer output and, for a given user-selected virtual clock, applying the respective timer calibration data set thereto to adjust said output and to generate a corresponding selected virtual clock output; and
    (e) signature means for generating a time-stamped output in dependence upon the selected virtual clock output and the input data.

2. The time-stamping device as claimed in claim 1 in which each virtual clock has associated with it a respective signature key, the signature means generating the time-stamped output using the key associated with the selected virtual clock.

3. The time-stamping device as claimed in claim 2 in which the signature means concatenates the selected virtual clock output and the input data, and signs the resultant concatenated data.

4. The time-stamping device as claimed in claim 2 in which each signature key comprises a private part of a public/private key pair.

5. The time-stamping device as claimed in claim 2 including key access control means for authorizing requests for key management operations.

6. The time-stamping device as claimed in claim 1 including time-stamp access control means for authorizing user requests to time-stamp the input data in accordance with a given virtual clock output.

7. The time-stamping device as claimed in claim 1 including virtual clock access control means for authorizing requests to modify the calibration information for a given virtual clock.

8. The time-stamping device as claimed in claim 1 comprising a hardware module.

9. A method of digitally time-stamping input data, comprising:
    (a) selecting one set of timer calibration data from a plurality of such stored sets, each set defining the characteristics of a respective virtual clock;
    (b) adjusting an output of a free-running timer by applying a respective timer calibration set thereto to generate a corresponding selected virtual clock output; and
    (c) signing data representative of both the selected virtual clock output and the input data to generate a time-stamped output.

10. The method as claimed in claim 9 in which each virtual clock has associated with it a respective signature key, the method including generating the time-stamped output using the key associated with the selected virtual clock.

11. The method as claimed in claim 10 including concatenating the selected virtual clock output and the input data, and signing the resultant concatenated data.

12. The method as claimed in claim 10 in which each signature key comprises a private part of a public/private key pair.

13. The method as claimed in claim 10 including checking the credentials of requests for key management operations.

14. The method as claimed in claim 9 including checking credentials of user requests to time stamp the input data in accordance with a given virtual clock output.

15. The method as claimed in claim 9 including checking the credentials of requests to modify the calibration information or a given virtual clock.

* * * * *